(12) United States Patent
Tanaka et al.

(10) Patent No.: US 7,766,781 B2
(45) Date of Patent: Aug. 3, 2010

(54) DIFFERENTIAL

(75) Inventors: Katsumi Tanaka, Utsunomiya (JP); Masaki Gotoh, Nagoya (JP)

(73) Assignee: GKN Driveline Torque Technology KK, Tochigi-shi, Tochigi-ken (JP)

( * ) Notice: Subject to any disclaimer, the term of this patent is extended or adjusted under 35 U.S.C. 154(b) by 598 days.

(21) Appl. No.: 11/585,602

(22) Filed: Oct. 23, 2006

(65) Prior Publication Data
US 2007/0093349 A1     Apr. 26, 2007

(30) Foreign Application Priority Data

Oct. 26, 2005    (JP)    ............................. 2005-311606
Oct. 10, 2006    (JP)    ............................. 2006-276335

(51) Int. Cl.
*F16H 48/20*    (2006.01)
(52) U.S. Cl. ..................................... 475/231
(58) Field of Classification Search .................. 475/231
See application file for complete search history.

(56) References Cited

U.S. PATENT DOCUMENTS

| | | | | |
|---|---|---|---|---|
| 2,270,567 A | * | 1/1942 | Slider | .......................... 475/251 |
| 2,569,533 A | * | 10/1951 | Morgan | ........................ 475/233 |
| 3,253,483 A | * | 5/1966 | McCaw | ........................ 475/226 |
| 3,815,442 A | * | 6/1974 | McAninch et al. | ........... 475/235 |
| 4,004,471 A | * | 1/1977 | Keske | ........................... 475/251 |
| 6,083,133 A | * | 7/2000 | Dye | ............................ 475/230 |
| 6,811,511 B2 | * | 11/2004 | Zeise | ........................... 475/248 |
| 6,912,926 B2 | * | 7/2005 | Basstein | ....................... 74/416 |

FOREIGN PATENT DOCUMENTS

JP            11-182650            7/1999

* cited by examiner

*Primary Examiner*—Ha D. Ho
(74) *Attorney, Agent, or Firm*—Morrison & Foerster LLP

(57) ABSTRACT

A differential for a vehicle having a first output shaft and a second output shaft for wheels is provided. The differential includes an input member for inputting a driving force from an outside of the differential, a first face gear and a second face gear, both of which can be rotated by the input member, the first face gear and the second face gear being rotatable together with the first output shaft and the second output shaft and a pinion member that meshes with both the first face gear and the second face gear so as to allow a differential motion between the first face gear and the second face gear.

16 Claims, 10 Drawing Sheets

DIFFERENTIAL

BACKGROUND OF THE INVENTION

1. Field of the Invention

The present invention relates to differentials, more particularly, a differential using face gears as a differential gear.

2. Description of the Related Art

Japanese Patent Laid-open Publication No. 11-182650 discloses a differential including a differential mechanism adopting a bevel gear. The bevel gear generates a limited-slip differential torque due to its gearing reaction forces.

SUMMARY OF THE INVENTION

In general, the bevel gear during its operation is generally subjected to a great backlash. Then, there is produced a loss in thrust force due to a gearing reaction force applied on the bevel gear. Therefore, the differential is required to minimize such a backlash as possible.

Under a situation mentioned above, an object of the present invention is to provide a differential whose limited-slip differential operation is improved.

In order to achieve the above object, according to a first aspect of the present invention, there is provided a differential having a first output shaft and a second output shaft, comprising: an input member for inputting a driving force from an outside of the differential; a first face gear and a second face gear, both of which can be rotated by the input member, the first face gear and the second face gear being rotatable together with the first output shaft and the second output shaft; and a pinion member that meshes with both the first face gear and the second face gear so as to allow a differential motion between the first face gear and the second face gear.

According to a second aspect of the present invention, the differential of the first aspect further comprise a friction member which is interposed between the input member and at least one of the first face gear and the second face gear.

According to a third aspect of the present invention, in the differential of the second aspect, the friction member includes a disc-shaped plate.

According to a fourth aspect of the present invention, the differential of the first aspect further comprises a limited-slip differential mechanism which is interposed between the input member and at least one of the first face gear and the second face gear.

According to a fifth aspect of the present invention, in the differential of the fourth aspect, the limited-slip differential mechanism includes a friction clutch.

According to a sixth aspect of the present invention, the differential of the first or fourth aspect further comprises a resilient member arranged between the first face gear and the second face gear. Then, the resilient member is connected with the first face gear and the second face gear through a first retainer and a second retainer, respectively. Further, the resilient member is arranged so that its pressure acts in a same direction as respective thrust forces of the first face gear and the second face gear due to the first and second gears' meshing with the pinion member.

According to a seventh aspect of the present invention, the differential of the sixth aspect, the friction member is adopted so as to receive the thrust force and the pressure of the resilient member at different positions from each other in a circumferential direction of the friction member.

According to an eighth aspect of the present invention, the differential of the first or fourth aspect further comprises a resilient member arranged between the input member and at least one of the first gear and the second face gear. Then, the resilient member is connected with the one of the first and second face gears through the friction member. Further, the resilient member is arranged so that its pressure acts in an opposite direction to a thrust force of the one of the first and second face gears due to the one gears' meshing with the pinion gear.

According to a ninth aspect of the present invention, in the differential of the eighth aspect, the friction member is adapted so as to receive the thrust force and the pressure of the resilient member at different positions from each other in a circumferential direction of the friction member.

According to a tenth aspect of the present invention, in the differential of the third aspect, the plate is a single annular plate that is arranged between the input member and at least one of the first face gear and the second face gear. Additionally, both an inner wall formed on the input member and a rear surface of the one of the first and second face gears include annular opposing surfaces extending in a radial direction of the differential while maintaining an interval between the inner wall of the input member and the rear surface of the one of the first and second face gears, the interval having a thickness substantially equal to the plate.

According to an eleventh aspect of the present invention, in the differential of the third aspect, the pinion member comprises a plurality of pinion gears arranged in a circumferential direction of the differential. Then, the resilient member comprises a plurality of springs arranged in the circumferential direction of the differential. Further, respective meshing parts between the first and second face gears and the pinion gears and pressing parts of the springs are positioned alternately in the circumferential direction.

According to a twelfth aspect of the present invention, in the differential of the first aspect, the input member has a first positioning part for determining an outside position of the pinion member in the radial direction of the differential.

According to a thirteenth aspect of the present invention, in the differential of the twelfth aspect, the first positioning part is shaped to form a spherical surface partially.

According to a fourth aspect of the present invention, the differential of the twelfth aspect further comprises a second positioning part for determining an inside position of the pinion member in the radial direction of the differential.

According to a fifteenth aspect of the present invention, in the differential of the fourteenth aspect, the second positioning part is arranged in both the first face gear and the second face gear.

According to a sixteenth aspect of the present invention, the differential of the fourteenth aspect further comprises a supporting member which is supported by the first face gear and the second face gear, wherein the second positioning part is arranged in the supporting member.

According to a seventeenth aspect of the present invention, in the differential of the sixteenth aspect, the supporting member comprises a spacer for restricting respective positions of both the first face gear and the second face gear in the axial direction of the differential.

According to an eighteenth aspect of the present invention, in the differential of the sixteenth aspect, the supporting member comprises a retainer which supports an elastic member for exerting an elastic force on the first face gear and the second face gear.

According to a nineteenth aspect of the present invention, the differential of the first aspect further comprises an annular oil pool arranged outside the first face gear and the second face gear in the radial direction of the differential.

These and other objectives and features of the present invention will become more fully apparent from the following description and appended claims taken in conjunction with the accompanied drawings.

DETAILED DESCRIPTION OF THE PREFERRED EMBODIMENT

Figure 1:
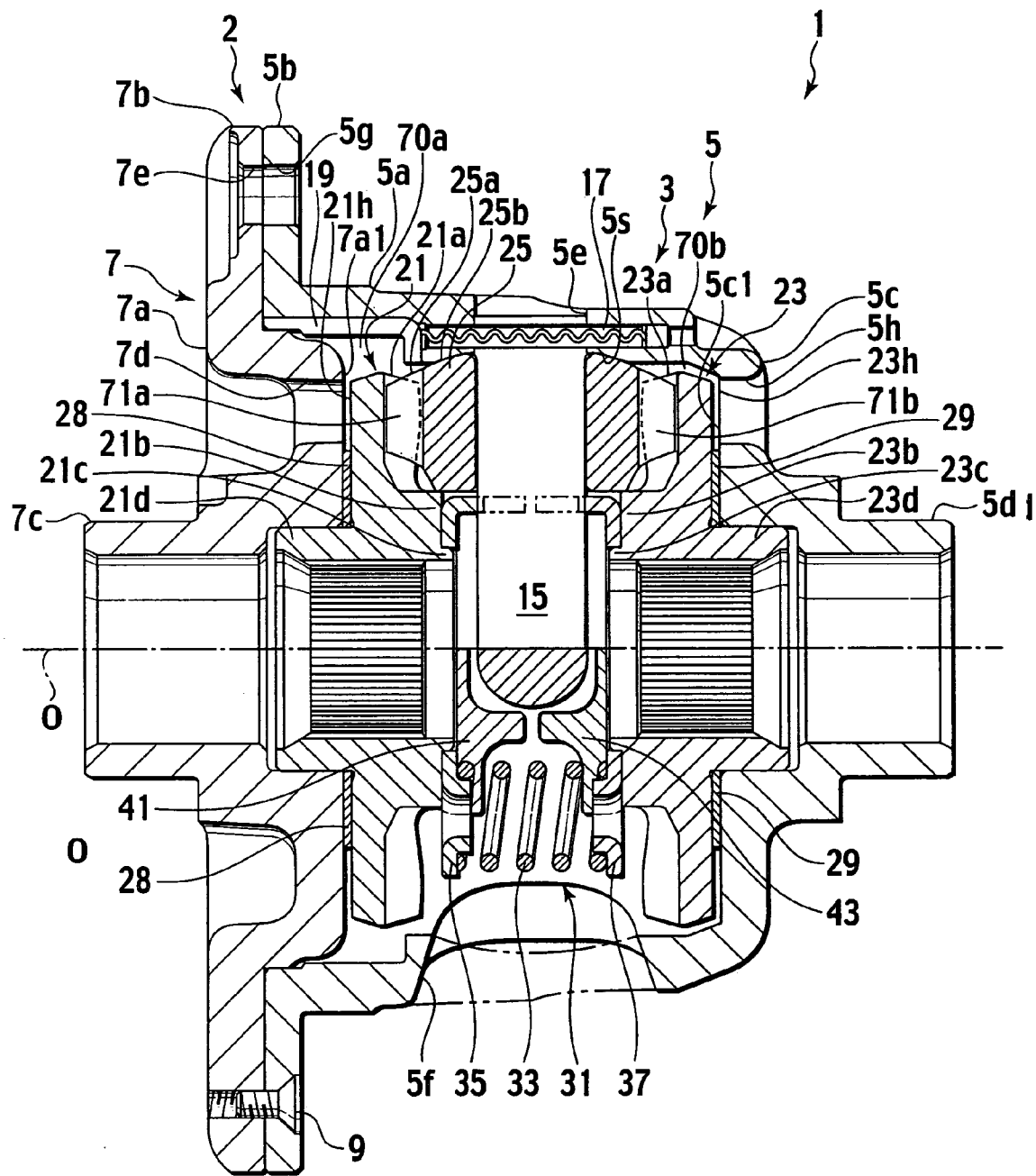
FIG. 1 is a longitudinal sectional view of a differential in accordance with a first embodiment of the present invention, showing a section taken along a line I-I of FIG. 2.

Embodiments of the present invention will be described with reference to accompanying drawings.

1st. Embodiment

Referring to FIGS. 1 to 4, we first describe a differential in accordance with a first embodiment of the present invention. The differential 1 comprises a differential case 2 (as an input member of the invention) and a differential mechanism 3 which can be rotated by the differential case 2.

The differential case 2 includes a first case 5 and a second case 7. The second case 7 is fixed to the first case S by means of a plurality of bolts 9. The differential case 2 is fixed to a ring gear (not shown).

Figure 2:
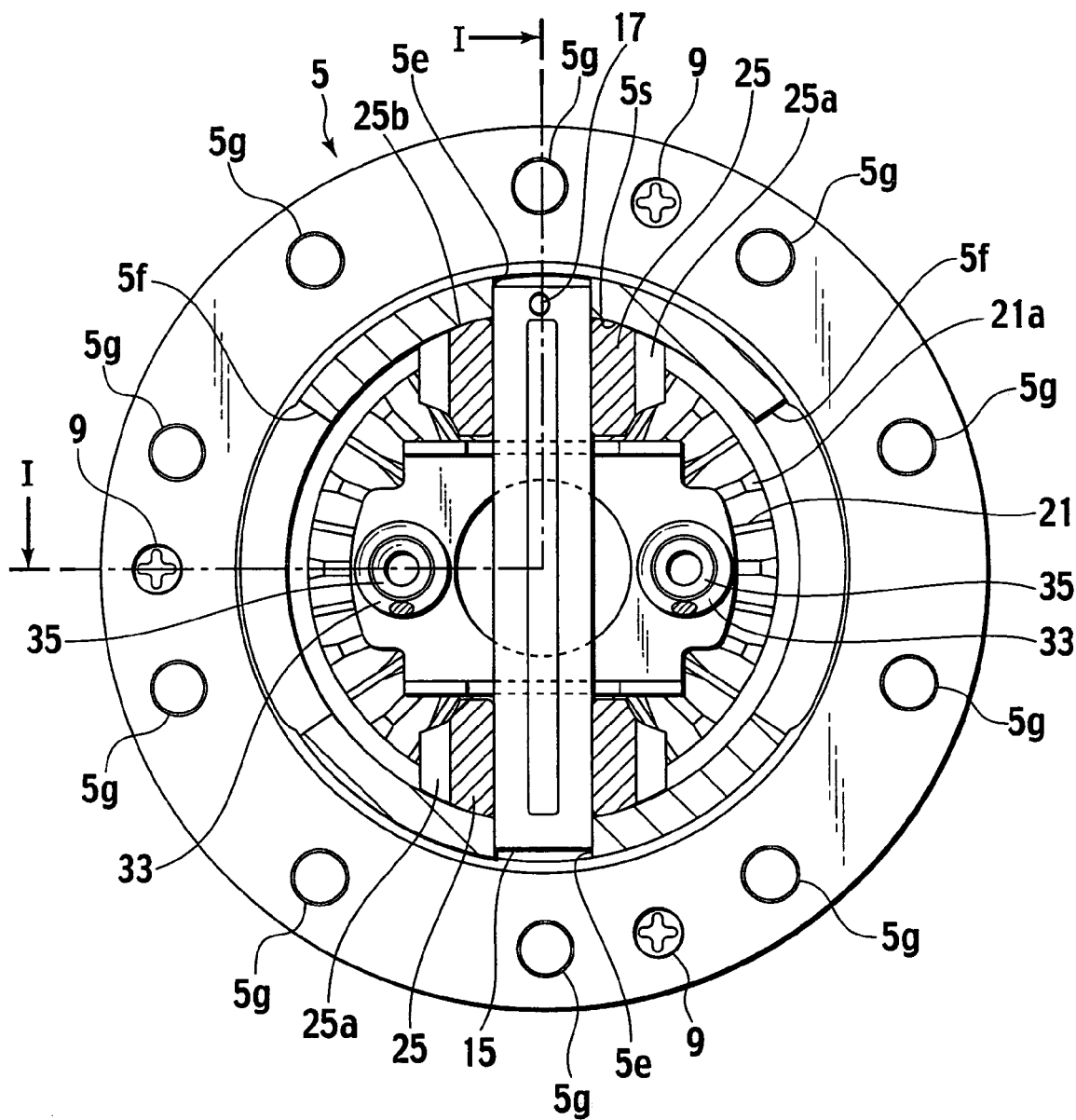
FIG. 2 is a cross-sectional view of the differential of FIG. 1.
Figure 3:
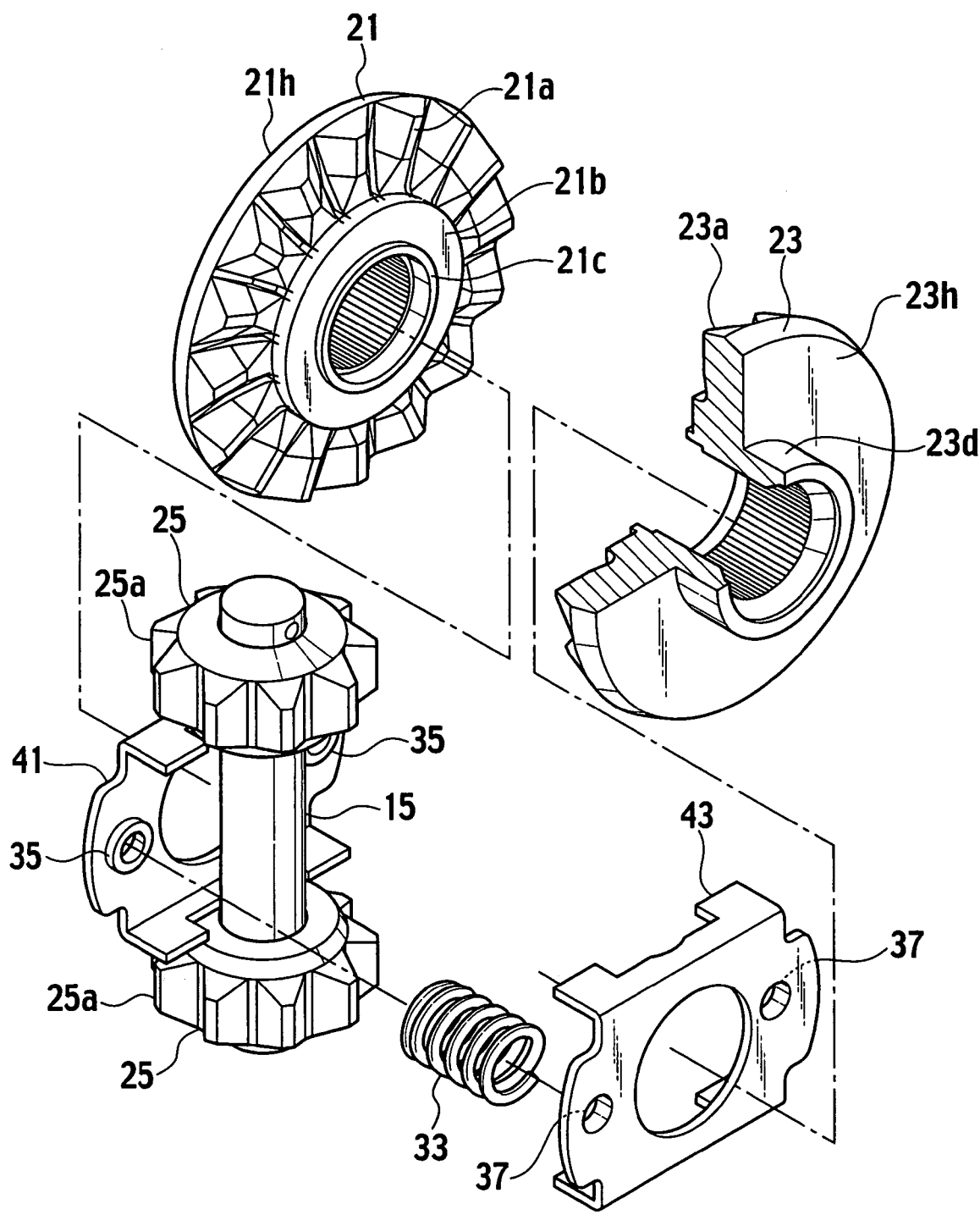
FIG. 3 is an exploded perspective view of a differential mechanism of FIG. 1.
Figure 4:
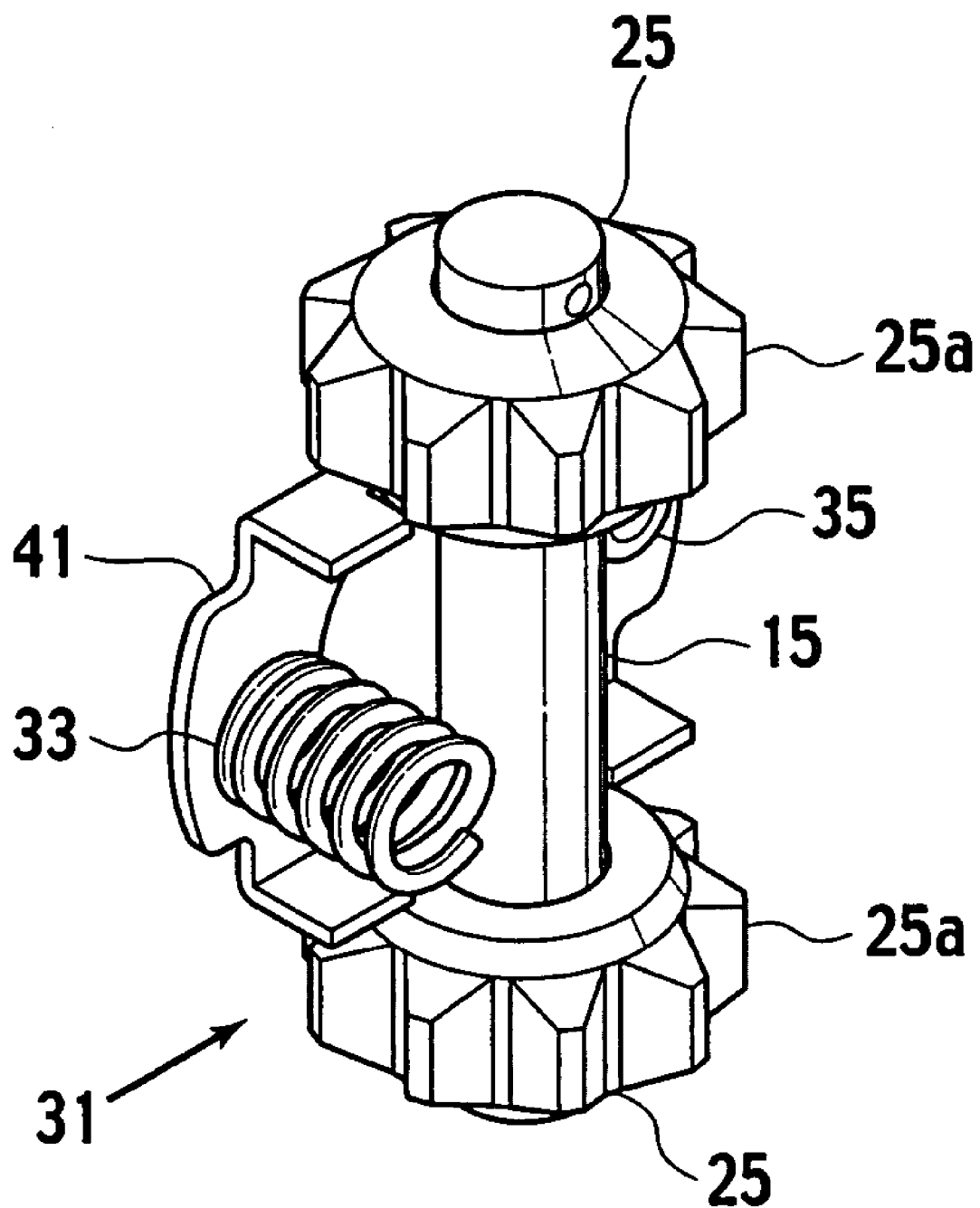
FIG. 4 is a perspective view of an assembly shown in FIG. 1, which comprises a pinion shaft, pinion gears and retainers.

The first case 5 has a circumferential wall 5a formed to extend around an axis O of the differential 1. As shown in FIG. 2, the circumferential wall 5a is provided, in both directions of zero hour and six hour, with two holes 5e for allowing an insertion of a pinion shaft 15 into the differential case 5. The circumferential wall 5a further includes two additional holes 5f in both directions of three hour and nine hour. The circumferential wall 5a is further provided, on its one end, with a flange 5b extending in a radial direction of the differential 1. As shown in FIG. 2, the flange 5b has a plurality of attachment holes 5g formed to allow insertion of bolts for fixing the above ring gear to the differential case 2. The first case 5 further includes a side wall 5c formed to extend from the circumferential wall 5a inwardly in the radial direction of the differential 1. The side wall 5c has a lubricant communication hole 5h formed to penetrate the wall 5c in an axial direction of the differential 1. The lubricant communication hole 5h is provided to allow a flowage of lubricating oil. The side wall 5c has an inner wall 5c1 extending perpendicularly to the axial direction of the differential 1. The first case 5 has a boss 5d formed to extend from the side wall 5c outwardly in the axial direction of the differential 1.

The second case 7 has a side wall 7a formed to extend in the radial direction of the differential 1. The side wall 7a is provided with a communication hole 7d which penetrates the wall 7a in the axial direction of the differential 1. The side wall 7 has an inner wall 7a1 formed to extend perpendicularly to the axial direction of the differential 1.

The second case 7 has a flange 7b formed to extend from one end of the side wall 7a in the radial direction of the differential 1. The flange 7b has a plurality of attachment holes 7e formed so as to communicate with the attachment holes 5g. These attachment holes 7e are also provided to accept the above-mentioned bolts for fixing the above ring gear. The second case 7 has a boss 7c formed to extend from the other end of the side wall 7a outwardly in the axial direction of the differential 1.

The differential mechanism 3 includes a pinion shaft 15 inserted into the first case 5 through the hole 5e. In order to prevent the pinion shaft 15 from dropping out of the first case 5A, a spring pin 17 is arranged so as to penetrate the first case 5 and the pinion shaft 15 being inserted into the first case 5. Additionally, in order to cope with a situation such that the spring pin 15 falls out of the differential 1, the spring pin 15 is hooked by an annular protrusion (portion) 19 formed on the second case 7.

The differential mechanism 3 comprises a pair of pinion gears 25, 25 positioned on both ends of the pinion shaft 15. The pinion gears 25, 25 in pairs are rotatable around the pinion shaft 15. Each of the pinion gears 25 has a sliding surface 25b making direct contact with an inner surface 5s of the first case 5. The inner surface 5s of the first case 5 serves as a positioning part (as a first positioning part of the invention) for determining an outside position of each pinion gear 25 in the radial direction. The first positioning part is shaped so as to form a spherical surface having a designated curvature partially. Each of the pinion gears 25 has teeth 25a formed to extend in parallel with the axial direction of the differential 1, operating as one spur gear. Note that a helical gear may be available as the pinion gear 25. Regarding each pinion gear 25, a gear's outer surface (in the radial direction of the differential 1), which extends from respective outer surfaces of the teeth 25a to the sliding surface 25b, is also shaped so as to partially form a spherical surface having the same curvature as that of the first positioning part.

The differential mechanism 3 includes a pair of side gears 21, 23 arranged in axial symmetry with each other with respect to the pinion shaft 15. The side gears 21, 23 are formed by face gears, respectively. The side gear 21 has teeth 21a formed to oppose the pinion gears 25 and extend in parallel with the axial direction of the differential 1. Similarly, the other side gear 23 has teeth 23a formed to oppose the pinion gears 25 and extend in parallel with the axial direction of the differential 1. Both of the teeth 21a and the teeth 23a mesh with the teeth 25a of each pinion gear 25. The side gear 21 has a rear wall 21h arranged on the opposite side of the teeth 21a. Similarly, the other side gear 23 has a rear wall 23h arranged on the opposite side of the teeth 23a. The rear walls 21h, 23h are formed so as to extend perpendicularly to the axial direction of the differential 1. Both of the rear wall 21h and the inner wall 7a1 define respective annular opposed surfaces extending in the radial direction of the differential 1 while ensuring an interval whose thickness is substantially equal to a thickness of the friction plate 28 between the rear wall 21h and the inner walls 7a1. Similarly, both of the rear wall 23h and the inner wall 5c1 define respective annular opposed surfaces extending in the radial direction of the differential 1 while ensuring an interval whose thickness is substantially equal to a thickness of the friction plate 29 between the rear wall 23h and the inner walls 5c1.

The side gears 21, 23 are provided with annular supporting bodies 21b, 23b extending ahead of the teeth 21a and the teeth 23a, respectively. The supporting bodies 21b, 23b support an inside tip of each pinion gear 25 in the radial direction of the differential 1. The supporting bodies 21b, 23b operates as another positioning part (as a second positioning part of the invention) for determining an inside position of each pinion gear 25 in the radial direction of the differential 1. The side gears 21, 23 have annular projections 21c, 23c formed to extend ahead of the supporting bodies 21b, 23b in the axial direction of the differential 1, respectively. Again, the side gears 21, 23 have bosses 21d, 23d formed to extend outwardly in the axial direction of the differential 1, respectively. The boss 21d of the side gear 21 is slidably supported by an inner circumferential surface of the side wall 7a of the second case 7. While, the boss 23d of the other side gear 23 is slidably supported by an inner circumferential surface of the side wall 5c of the first case 5.

Meshing parts between the first and second side gears 21, 23 and the pinion gears 25 are established in several positions in the circumferential direction of the side gears 21, 23 equally. Further, respective pressing parts of the plural springs 33 are also established in several positions in the circumferential direction of the side gears 21, 23 equally. Regarding each of the springs 33, it is further established that circumferential distances from the spring 33 up to the circumferentially-adjacent two pinion gears 25 become equal to each other.

The differential 1 includes the friction plates 28, 29 operating as a friction clutch of the invention. The position of the friction plate 28 in the axial direction of the differential 1 is determined by both the rear wall 21h of the first side gear 21 and the side wall 7a of the case 7. Similarly, the position of the friction plate 29 in the axial direction of the differential 1 is determined by both the rear wall 23h of the second side gear 23 and the side wall 5c of the case 5. For instance, these friction plates 28, 29 are formed by disc-shaped plates that make frictional contact with the differential cases 7, 5 and the side gears 21, 23 by designated frictional coefficients, respectively. In this invention, a friction plate can be provided only between the differential case 2 and at least one of the first side gear 21 and the second side gear 23.

The differential 1 has a retainer 31 arranged between the first side gear 21 and the second side gear 23 in the axial direction of the differential 1. The retainer 31 comprises a pair of retainer members 41, 43 disposed on respective side walls of the supporting bodies 21c, 23c, respectively. In arrangement, the pinion shaft 15 is interposed between the retainer member 41 and the retainer member 43. The retainer 31 further includes two coil springs 33. Each of the coil springs 33 is arranged between a spring receptor 35 of the retainer member 41 and another spring receptor 37 of the retainer member 43. Thus, each of the retainer members 41, 43 is provided with two spring receptors 35, 35 (37, 37). These coil springs 33, 33 urge the first and second side gears 21, 23 against the friction plates 28, 29, respectively.

Meanwhile, on consideration of setting load, pressure balance and so on, the spring 33 may be formed by either divided resilient members or a resilient member where small springs are assembled. That is, the function of the spring 33 may be accomplished by a single resilient member containing a group of springs.

A space defined by the inner circumferential surface of the differential case 2 and the outer surface of the side gear 21 in the radial direction of the differential 1 functions as an annular oil pool 70a for pooling oil as lubricant for the friction plate 28 etc. Similarly, another space defined by the inner circumferential surface of the differential case 2 and the outer surface of the side gear 23 in the radial direction of the differential 1 functions as an annular oil pool 70b for pooling oil as lubricant for the friction plate 29 etc.

Additionally, an additional oil pool 71a is defined in respective meshing parts between the first side gear 21 and the pinion gears 25. Similarly, an additional oil pool 71b is defined in respective meshing parts between the second side gear 23 and the pinion gears 25. The oil pool 71a is one space that is defined by the teeth of the side gear 21 and the teeth 25a of each pinion gear 25. The oil pool 71a is communicated with the communication hole 7d through the annular oil pool 70a. Similarly, the oil pool 71b is another space that is defined by the teeth of the side gear 23 and the teeth 25a of each pinion gear 25. The oil pool 71b is communicated with the communication hole 7h through the annular oil pool 70b.

Next, we describe the operation of the differential 1.

The ring gear (not shown) rotates together with the differential case 2. Then, the differential case 2 rotates together with the pinion shaft 15, the pinion gears 25 and the first and second side gears 21, 23.

If there is produced an uneven force between left and right wheels, then the force causes the pinion gears 25 to rotate and further causes the first and second side gears 21, 23 to rotate relatively to each other, producing a differential motion therebetween.

Under respective thrust forces, the pinion gears 25 urge the side gears 21, 23 against the friction plates 28, 29, causing frictional forces between the friction plates 28, 29 and the side gears 21, 23. The differential motion between the side gears 21 and 23 is limited by the frictional forces. Repeatedly, the pinion gears 25 are formed by spur gears, while the first and second side gears 21, 23 are formed by face gears. Each tooth trace of the pinion gears 25 and the side gears 21, 23 as the face gears extends substantially perpendicularly to the axial direction of the differential 1. Accordingly, pressures between the pinion gears 25 and the side gears 21, 23 are intended so as not to act in the radial direction as possible but in the axial direction. Thus, the differential 1 is capable of generating considerably-great axial components of the meshing thrust forces that are produced in the side gears 21, 23 due to the meshing between the pinion gears 25 and the side gears 21, 23. Consequently, the pressures against the friction plates 28, 29 are increased to establish a larger limited-slip differential force.

According to the above-mentioned embodiment, since each of the side gears 21, 23 as the face gears generates a gearing reaction force that is larger in the thrust direction than that of the other gear at the same pressure angle, it is possible to establish a large limited-slip differential torque in comparison with that of another differential using the same clutch and cone-tapered bevel gears.

Additionally, as the combination of the side gears 21, 23 with the pinion gears 25 allows its axial length to be shortened, it is possible to ensure spaces for installing the friction plates 28, 29 easily.

The coil springs 33 under pressure act on the first and second side gears 21, 23 from an early stage of the operation. Each of the springs 33 provides a uniform pressure to establish a stable limited-slip differential force. As the pressure acts in the same direction as the thrust force, the joint strength of the limited-slip differential mechanism 4 can be improved.

The positioning of each pinion gear 25 in the radial direction is determined by the inner surface 5a (i.e. the first positioning part) of the first case 5 and the supporting bodies 21b, 23b (i.e. the second positioning parts) of the side gears 21, 23. Consequently, it is possible to prevent the pinion gears 25 from being shifted in the radial direction, suppressing a dispersion of the thrust force in the radial direction, which would be caused by the meshing of the pinion gears 25 with the side gears 21, 23 certainly.

Since the radially-outer surface of each pinion gear 25 including the sliding surface 25b (and the first positioning part of the first case) is shaped so as to form a part of spherical surface, it is possible to prevent the pinion gear 25 from being shifted in the radial direction certainly.

Additionally, owing to the provision of the oil pools 70a, 70b that communicate the communication paths 7a and 5h of the first and second cases with the oil pools 71a, 71b at the meshing parts between the teeth 21a, 23a of the side gears 21, 23 and the teeth 25a of the pinion gears 25, the differential motions between the friction plates 28, 29, the side gears 21, 23 and between the pinion gears 25, 25 can be smoothened.

Note that, in order to enhance the limited-slip differential performance, respective sliding portions of both the friction plates 28, 29 and the side gears 21, 23 (or the differential case 2) may be provided with high-friction structures (predetermined hardness, roughness, etc.) by designated hardening treatment, designated surface treatment or coatings. Additionally, the friction plates 28, 29 may be modified, on their surfaces, so as to have grooves (e.g. circumferential grooves, radial grooves, lattices, etc.), irregularities, irregular roughness surfaces, etc. in view of improving the lubricating/cooling capability and further stabilizing the frictional characteristics. Alternatively, in order to improve the durability of the differential, the sliding surfaces of the above-mentioned components may be subjected to nitride processing or DLC (diamond like carbon) in view of increasing the surface hardness.

$2^{nd}$. Embodiment

Figure 5:
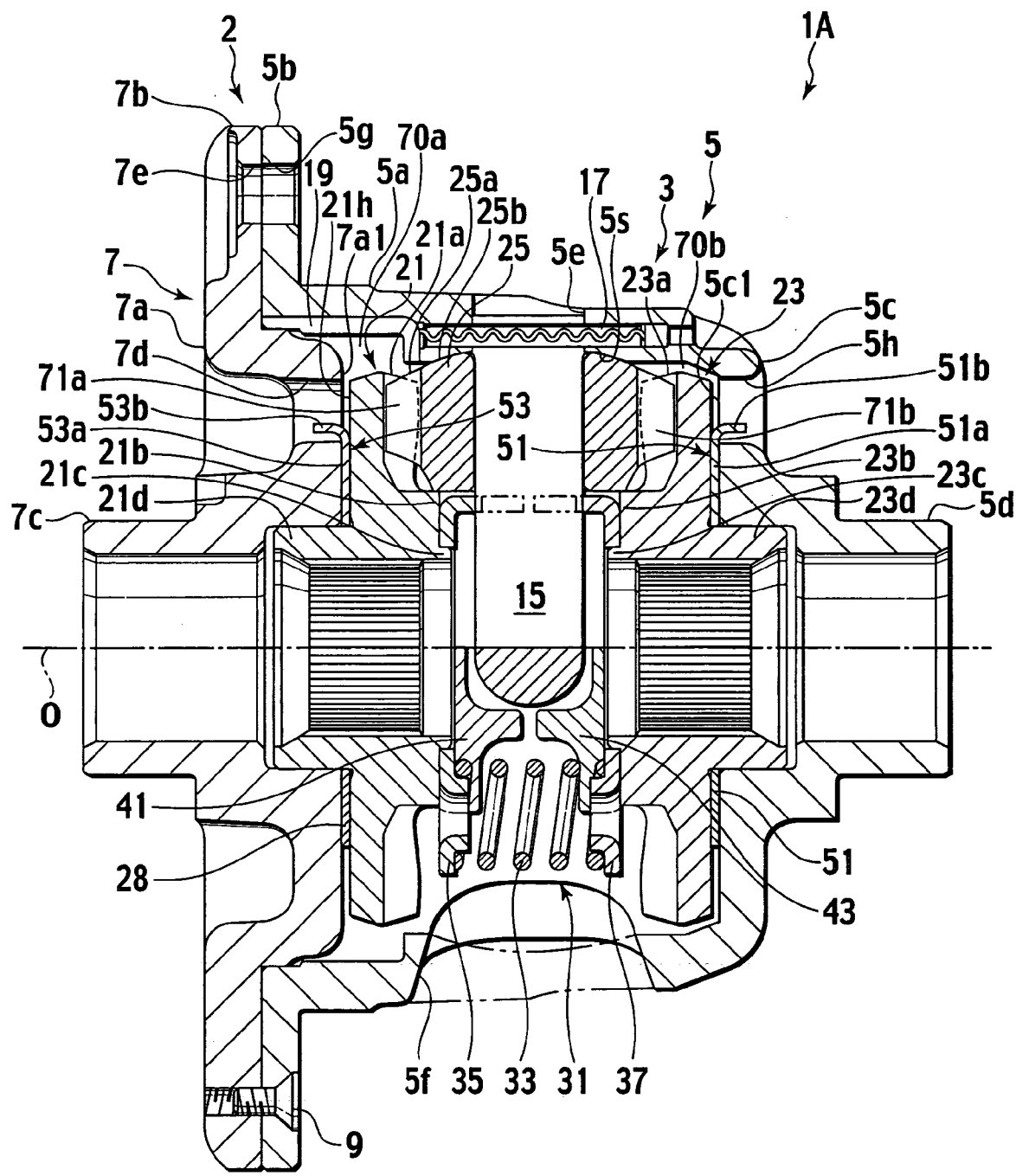
FIG. 5 is a longitudinal sectional view of a differential in accordance with a second embodiment of the present invention.

Referring to FIG. 5, we now describe another differential 1A in accordance with the second embodiment of the present invention.

The differential 1A of the second embodiment is characterized by metal friction plates 51, 52 whose surfaces are processed with "Nitrotec treatment (registered trade mark)" and which operate as friction clutches. Note that this Nitrotec treatment represents a kind of composite surface heat treatment that is composed of gas nitrocarburizing, black-oxidizing, rust proofing and lubrication/impregnation processes. The annular friction plates 51, 53 include clutch rings 51a, 53a extending radially outwardly to reach the communication holes 5h, 7d, respectively. The friction plates 51, 53 further include whirl-stops 51b, 53b extending from the clutch rings 51a, 53a in the axial direction to engage with the communication holes 5h, 7d. These friction plates 51, 53 establish a limited-slip differential force without sliding on the differential case 2.

In FIG. 5, the other members indicated with the other reference numerals are arranged in the same manner as the first embodiment and these members function as similar to the first embodiment. Therefore, descriptions about these members are eliminated.

$3^{rd}$. Embodiment

Figure 6:
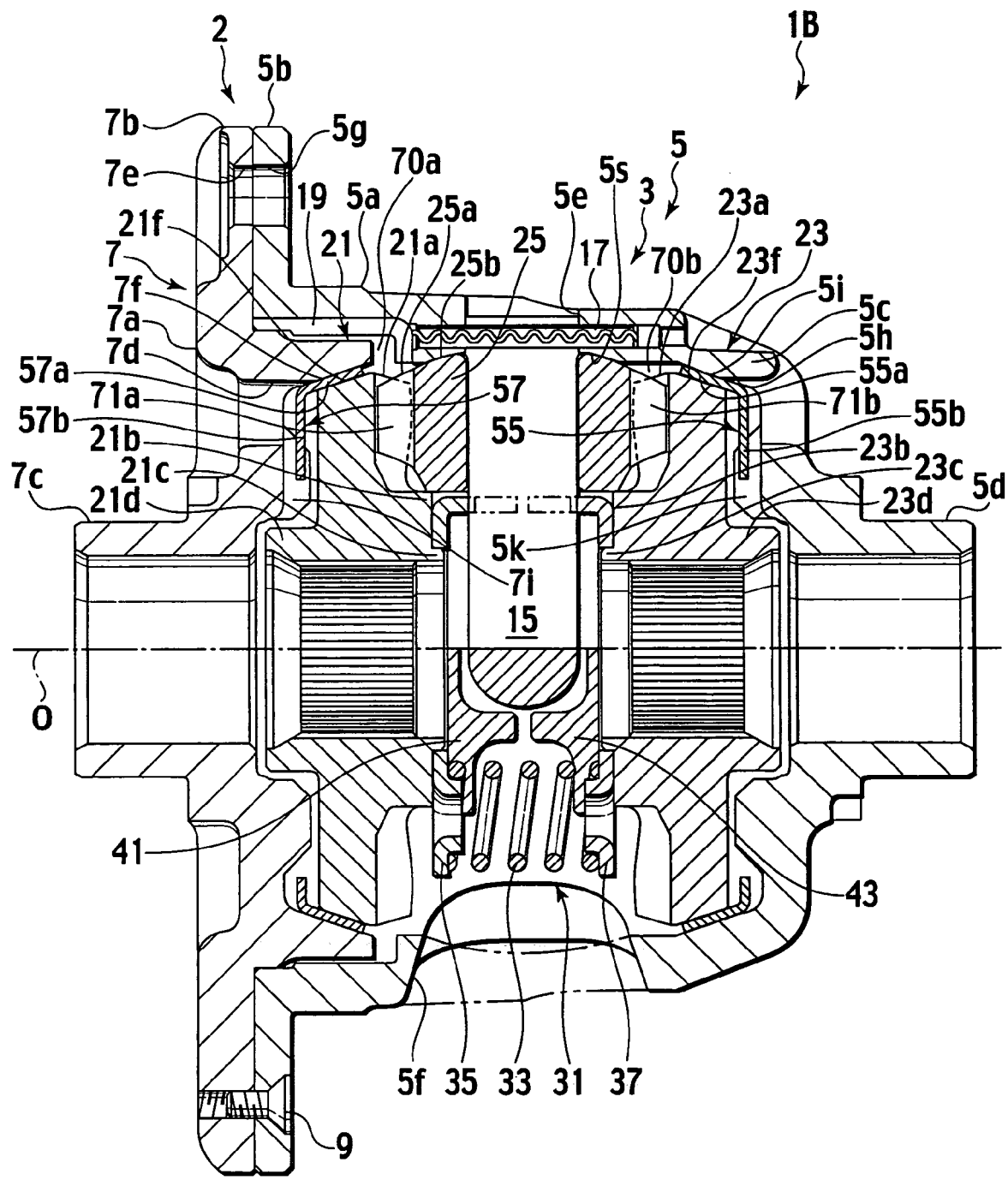
FIG. 6 is a longitudinal sectional view of a differential in accordance with a third embodiment of the present invention.

Referring to FIG. 6, a differential 1B in accordance with the third embodiment of the present invention will be described below.

The differential 1B is characterized by cone clutches 55, 57. The cone clutch 55 is arranged between the side gear 23 and the case 5, while the other cone clutch 57 is arranged between the side gear 21 and the case 7.

The side gears 21, 23 have annular top walls 21f, 23f formed obliquely to the axial direction of the differential 1B, respectively. While, the cases 5, 7 have inner walls 5i, 7f formed to extend in parallel with the top walls 23f, 21f, respectively.

The cone clutch 55 includes an annular tapered ring (portion) 55a arranged between the inner wall 5i and the top wall 23f and covered with DLC (diamond-like carbon) coating. The cone clutch 57 includes an annular tapered ring (portion) 57a arranged between the inner wall 7f and the top wall 21f and covered with DLC (diamond-like carbon) coating as well. The cone clutches 55, 57 further include stoppers (portions) 55b, 57b extending from the tapered rings 55a, 57a inwardly in the radial direction of the differential 1B, respectively. In operation, the stopper 55b engages with a projecting part 5k extending from the side wall 5c to stop a rotation of the cone clutch 55. Similarly, the stopper 57b also engages with a projecting part 7i extending from the side wall 7a to stop a rotation of the cone clutch 57.

In FIG. 6, the other members indicated with the other reference numerals are arranged in the same manner as the first embodiment and these members function as similar to the first embodiment. Therefore, descriptions about these members are eliminated.

$4^{th}$. Embodiment

Figure 7:
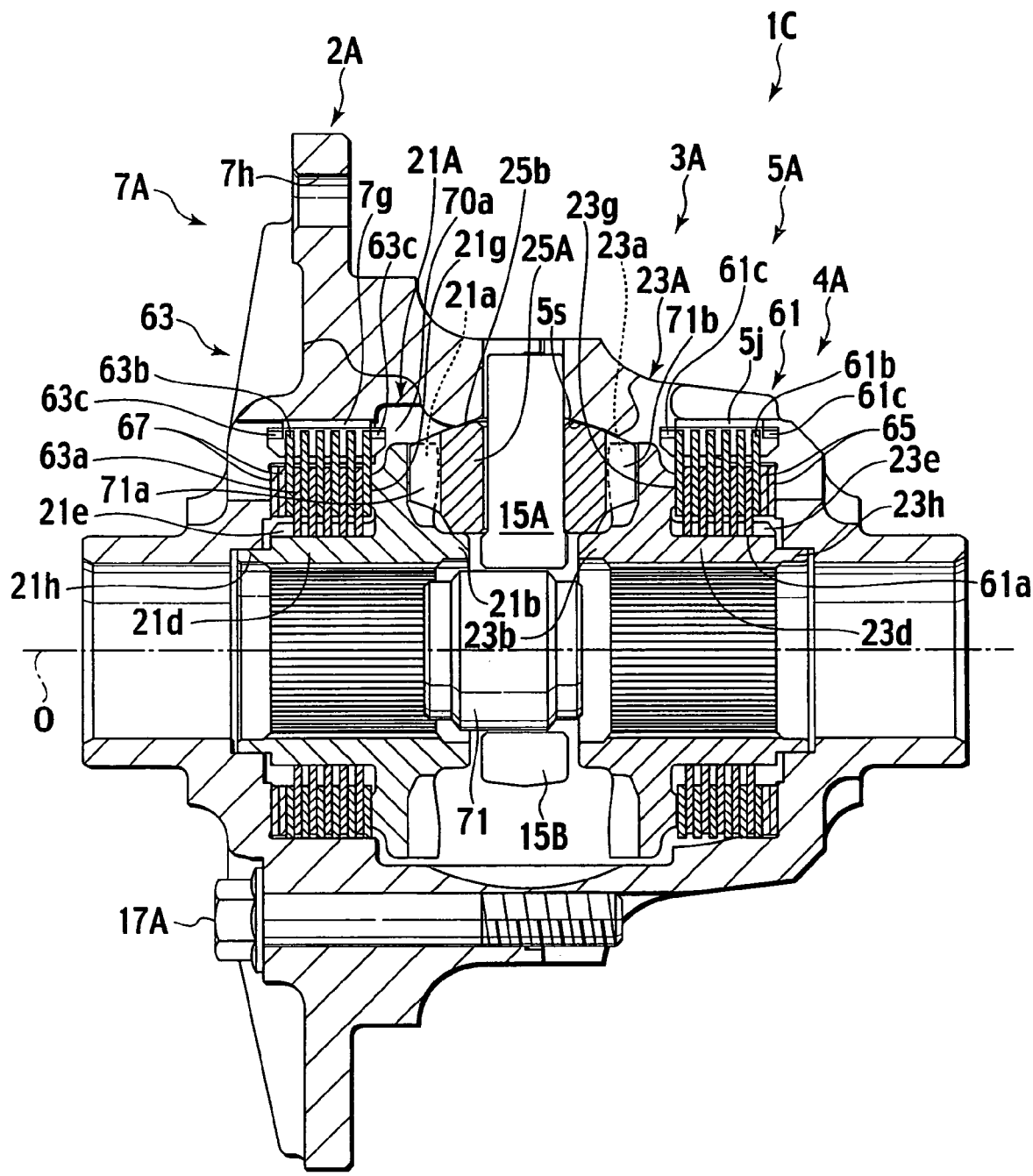
FIG. 7 is a longitudinal sectional view of a differential in accordance with a fourth embodiment of the present invention, showing a section taken along a line VII-VII of FIG. 8.
Figure 8:
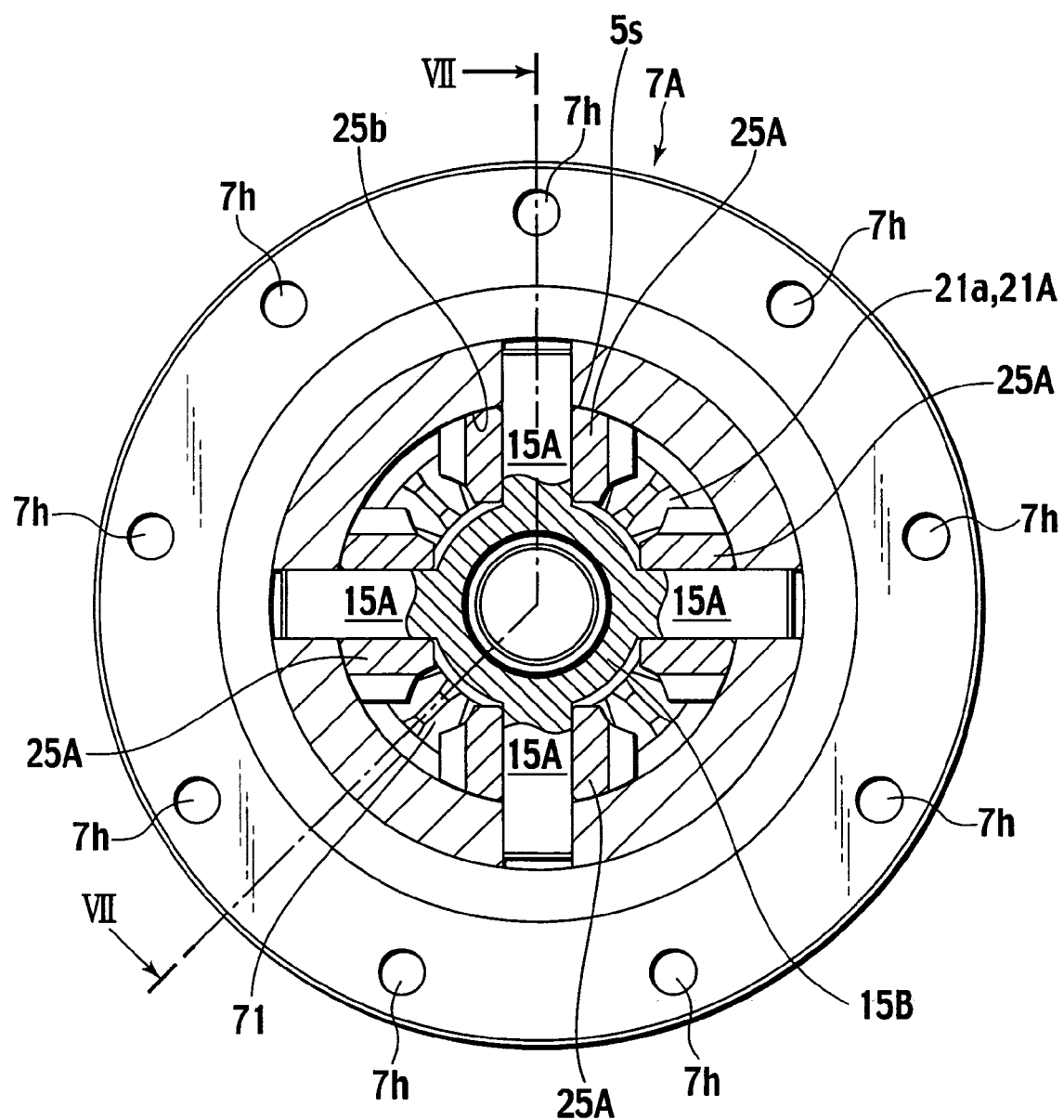
FIG. 8 is a cross-sectional view of the differential of FIG. 7.

Referring to FIGS. 7 and 8, we now describe a differential 1C in accordance with the fourth embodiment of the present invention.

The differential 1C includes a differential case 2A having a ring gear (not shown). The differential case 2A comprises a first case 5A and a second case 7A connected to each other through bolts 17A (only one shown in the figure).

The differential 1C includes a differential mechanism 3A disposed in the differential case 2A. The differential mechanism 3A is arranged between the first case 5A and the second case 7A and includes an annular base part 15B on the side of an axis of the differential 1C. The base part 15B is provided, at regular intervals in the circumferential direction of the differential 1C, with four pinion shafts 15A. These pinion shafts 15A are formed integrally with the base part 15B, extending outwardly in the radial direction of the differential 1C. In detail, the pinion shafts 15A are arranged at intervals of ½×p (i.e. 90 degrees) in the circumferential direction of the differential 1C. The pinion shafts 15A are interposed between the differential case 2A and a thrust member 71.

The differential mechanism 3A includes four pinion gears 25A (as the spur gears) rotatably supported by the pinion shafts 15A, respectively.

The differential mechanism 3A has a pair of side gears 21A, 23A (as the face gears) arranged to oppose to each other while interposing the pinion shafts 15A therebetween.

The side gears 21A, 23A have teeth 21a, 23a meshing with the pinion gears 25A, respectively. The side gears 21A, 23A have supporting bodies 21b, 23b formed to support the pinion gears 25A, respectively. The side gears 21A, 23A have bosses 21d, 23d formed to extend outwardly in the axial direction of the differential 1C, respectively. The bosses 21d, 23d are provided, on their outer circumferential surfaces, with splines 21e, 23e, respectively. Additionally, the side gears 21A, 23A have end portions 21h, 23h formed to extend from the bosses 21d, 23d outwardly, respectively. The end portions 21h, 23h are carried by the cases 7A, 5A, respectively. The side gears 21A, 23A have projections 21g, 23g formed on the opposite side of the teeth 21a, 23a, respectively.

The differential 1C further includes multiplate clutches 61, 63 as a limited-slip differential mechanism 4A. The multiplate clutches 61, 63 include inner plates 61a, 63a connected to the splines 23e, 21e, respectively. Additionally, the multiplate clutches 61, 63 include outer plates 61b, 63b connected to splines 5j, 7g, respectively. The clutches 61, 62 have engaging collars 61c, 63c interposed between the splines 5j, 7g and the outer plates 61b, 63b. These engaging collars 61c, 63c are provided in order to prevent an occurrence of high surface pressure that would be caused by the outer plates 61b, 63b directly engaging with the splines 5j, 7g of the differential case 5A of cast metal, respectively. The clutch 61 includes conical springs 65 between the plates 61a, 61b and the case 5A. Similarly, the clutch 63 includes conical springs 67 between the plates 63a, 63b and the case 7A. The conical springs 65, 67 are arranged in series in the axial direction, respectively. The conical springs 65 and the projection 23g press the inner plate 61a and the outer plate 61b in the opposite direction. Similarly, the conical springs 67 and the projection 21g press the inner plate 63a and the outer plate 63b in the opposite direction.

Next, we describe the operation of the differential 1C.

The ring gear (not shown) rotates together with the differential case 2A. Then, the differential case 2 rotates together with the pinion shafts 15A, the pinion gears 25A and the side gears 21A, 23A.

If there is produced an uneven force between left and right wheels, then the force causes the pinion gears 25A to rotate and further causes the first and second side gears 21A, 23A to rotate relatively to each other, producing a differential motion therebetween. The inner plates 61a, 63a rotate together with the side gears 21A, 23A, respectively. While, the outer plates 61b, 63b rotate together with the cases 5A, 7A, respectively.

The pinion gears 25A urge the projections 21g, 23g of the side gears 21A, 23A against the inner and outer plates 61a, 61b, 63a, 63b outwardly in the axial direction of the differential 1C. While, the conical springs 65, 67 press the inner and outer plates 61a, 61b, 63a, 63b inwardly in the axial direction. The inner and outer plates 61a, 61b rotate relatively while sliding since they are pressed between the projection 23g and the conical spring 65. Similarly, the inner and outer plates 63a, 63b rotate relatively while sliding since they are pressed between the projection 21g and the conical spring 67. These slide movements limit a differential motion between the side gear 21A and the side gear 23A.

Then, the pinion gears 25A do not press the side gears 21A, 23A in the radial direction but in the axial direction. Consequently, the multiplate clutches 61, 63 are fastened tightly under great pressure.

According to the fourth embodiment of the invention, the pressures of the conical springs 65, 67 operate in the opposite direction to the thrust forces of the side gears 21A, 23A. At an early stage, the conical springs 65, 67 act on the first and second side gears 21A, 23A due to characteristic features of the springs 65, 67, respectively. The conical springs 65, 67 control a limited-slip differential force at the early stage and enhance the fastening force of the limited-slip differential mechanism 4.

In FIGS. 7 and 8, the other members indicated with the other reference numerals are arranged in the same manner as the first embodiment and these members function as similar to the first embodiment. Therefore, descriptions about these members are eliminated.

5th. Embodiment

Figure 9:
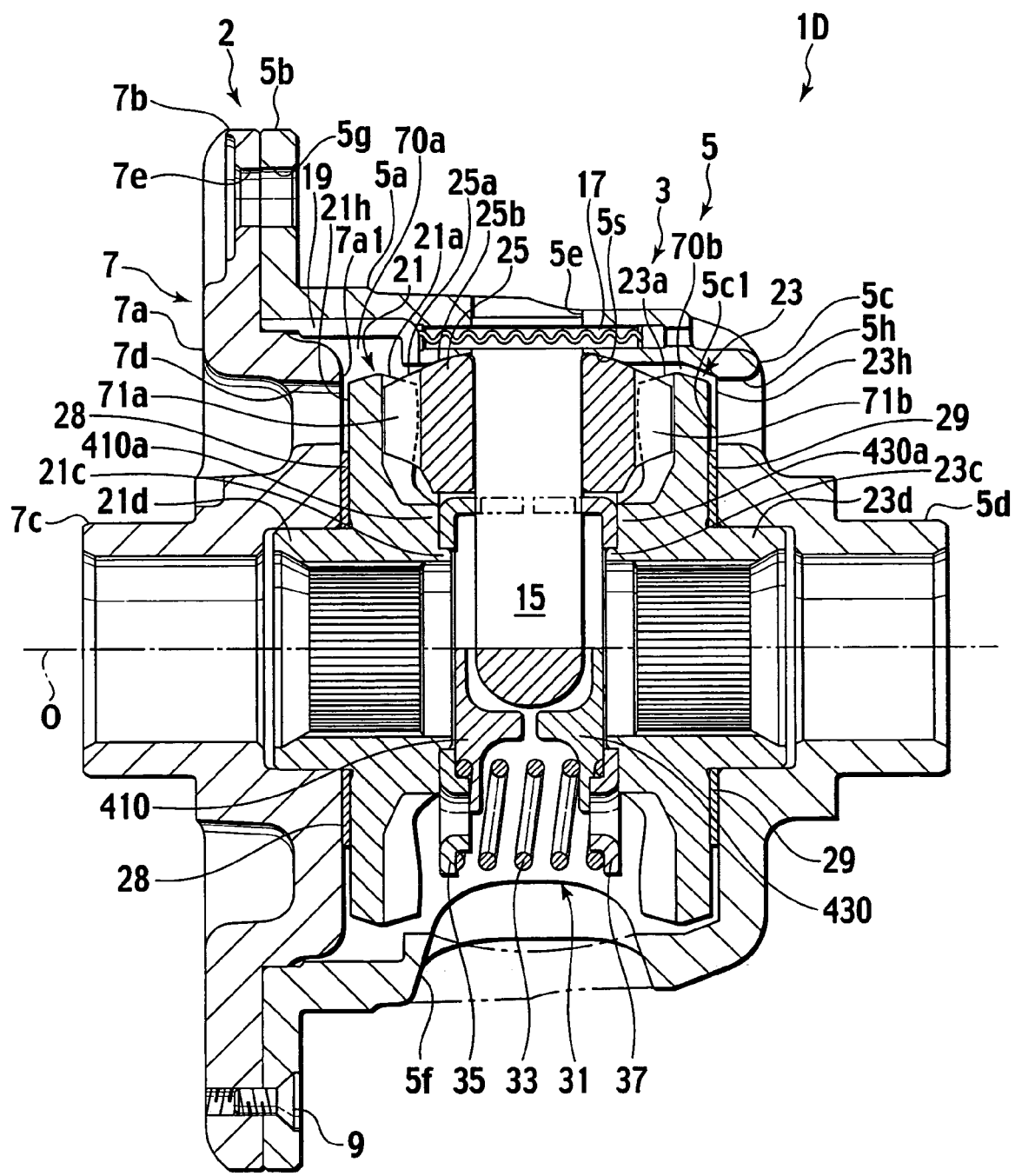
FIG. 9 is a longitudinal sectional view of a differential in accordance with a fifth embodiment of the present invention.

Referring to FIG. 9, we now describe a differential 1D in accordance with the fifth embodiment of the present invention.

The differential 1D is characterized in that the function of the second positioning part to determine the radially-inside position of each pinion gear 25 is provided by a first retainer member 410 and a second retainer member 430 in place of the supporting bodies 21a, 23a of the first and second side gears 21, 23. The first retainer member 410 is provided, on its both ends, with bending parts 410a extending in the axial direction. Similarly, the first retainer member 430 is also provided, on its both ends, with bending parts 430a extending in the axial direction. The bending parts 410a, 430a support, at their outside surface in the radial direction, the pinion gears 25 in the radial direction. Consequently, the positions of the pinion gears 25 in the radial direction of the differential 1D are determined by the inner surface (i.e. first positioning part) 5s of the first case 5 and the bending parts 410a, 430a of the first and second retainer members 410, 430.

In FIG. 9, the other members indicated with the other reference numerals are arranged in the same manner as the first embodiment and these members function as similar to the first embodiment. Therefore, descriptions about these members are eliminated.

6th. Embodiment

Figure 10:
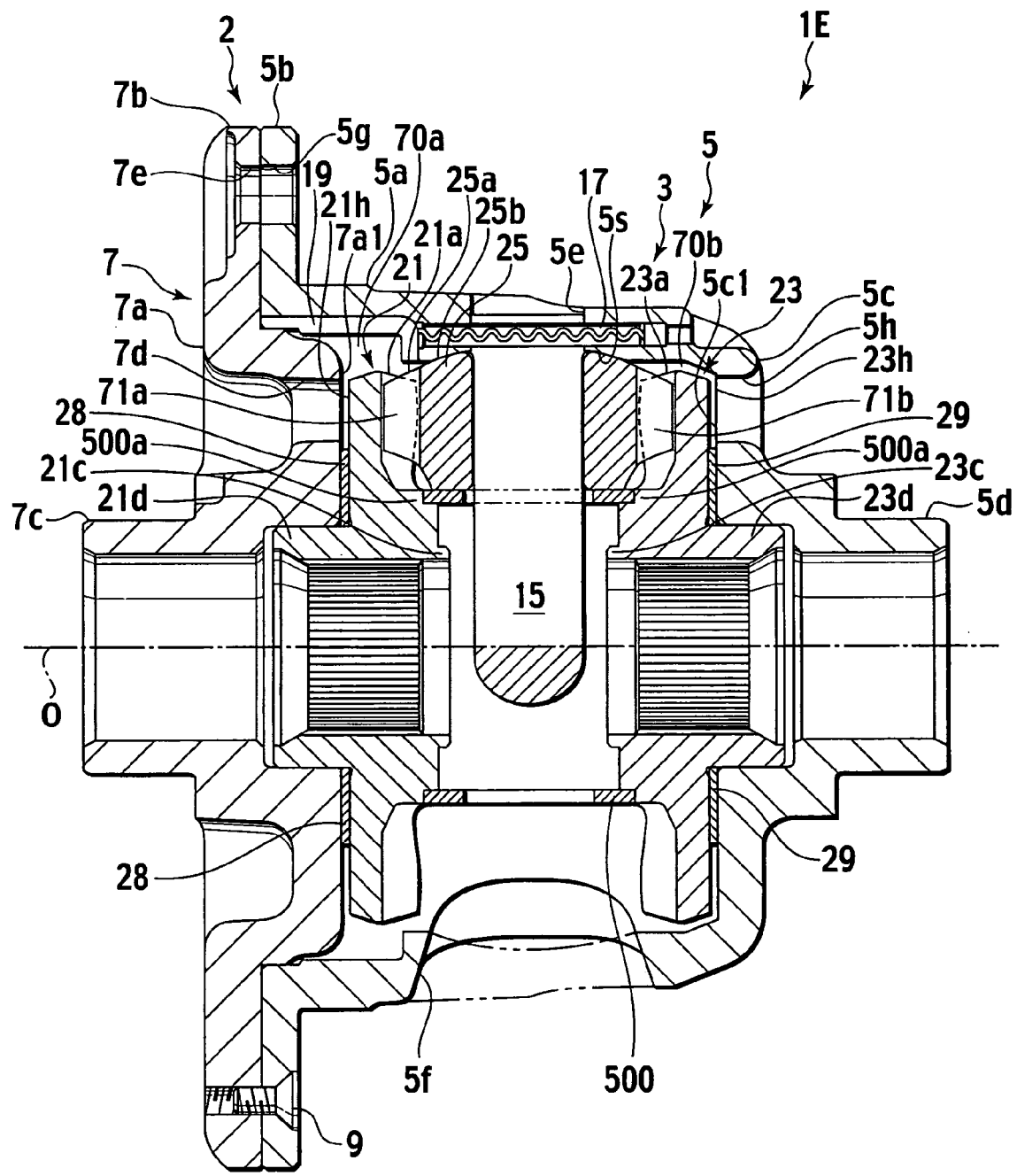
FIG. 10 is a longitudinal sectional view of a differential in accordance with a sixth embodiment of the present invention.

Referring to FIG. 10, we now describe a differential 1E in accordance with the sixth embodiment of the invention.

The differential 1E is characterized in that the function of the second positioning part to determine the radially-inside position of each pinion gear 25 is provided by a spacer member 500 in place of the supporting bodies 21a, 23a of the first and second side gears 21, 23.

The spacer member 500 is formed by a cylindrical member having through-holes for the pinion shafts 15, restraining the axial positions of the first and second side gears 21, 23. The spacer member 500 further has a bearing surface formed around each through-hole to support the pinion gear 25 in the radial direction of the differential 1E. Consequently, the positions of the pinion gears 25 in the radial direction of the differential 1E are determined by the inner surface 5s (i.e. the first positioning part) of the first case 5 and the bearing surfaces 500a of the spacer member 500.

In FIG. 10, the other members indicated with the other reference numerals are arranged in the same manner as the first embodiment and these members function as similar to the first embodiment. Therefore, descriptions about these members are eliminated.

Operations and effects of the present invention mentioned above will be summarized as follows.

First, according to the feature of the present invention, owing to the adoption of the face gears capable of generating great gearing reactive forces in the thrust direction at the same pressure angle, it is possible to establish a limited-slip differential torque larger than that of another differential using the same clutch plate and cone-tapered bevel gears.

Additionally, it is noted that a combination of the face gears with the pinion gear allows an axial length of such an assembly to be shortened, ensuring a space for the friction member.

In the operation of the differential, a pressure (urging force) of the resilient member (e.g. the springs 33) acts on the first and second face gears from an early stage of the operation. Owing to the application of a uniform pressure by the resilient member, it is possible to provide the differential with a stable limited-slip differential force. In one form of the invention, the pressure of the resilient member may operate in the same direction as the thrust force. The limited-slip differential mechanism could be enhanced in terms of its fastening force.

In another form of the invention, the pressure of the resilient member may operate in the opposite direction to the thrust force. In the early stage of the operation of the differential, the pressure of the resilient member would act on the first and second face gears in accordance with characteristics of the resilient member. Then, the resilient member controls a limited-slip differential force initially in the early stage of the operation, enhancing a fastening force of the limited-slip differential mechanism.

Under the influence of active forces, the friction member restrains a lopsided wearing between the friction member and the sliding member, preventing an occurrence of noise, vibrations, etc.

Further, by setting an outer diameter of the plate as the friction member to a predetermined value, it is possible to establish a desired fastening force of the limited-slip differential mechanism. This establishment facilitates a setting of the limited-slip differential characteristics or its modification.

In the present invention, owing to the arrangement of the meshing part and the pressing part, it is possible to improve an input balance between the meshing force and the pressure on the friction member, stabilizing the frictional characteristics of the differential furthermore.

The position of the pinion gear in the radial direction of the differential is determined by both the input member and the first and second face gears (or the supporting member supported by the first and second face gears). Consequently, it is possible to prevent the pinion from being displaced in the radial direction of the differential, whereby a radial dispersion of the thrust force caused by the pinion's meshing with the first and second face gears can be suppressed certainly.

Additionally, since the radially-outer surface of the pinion gear is shaped so as to form a spherical surface partially, it is possible to prevent the pinion gear from being displaced in the radial direction more certainly.

Still further, owing to the provision of the oil pool outside the first and second face gears in the radial direction, the differential motion of the friction plate etc. can be smoothened.

Finally, it will be understood by those skilled in the art that the foregoing descriptions are nothing but embodiments and various modifications of the disclosed differential and therefore, various changes and modifications may be made within the scope of claims.

This application is based upon the Japanese Patent Applications No. 2005-311606, filed on Oct. 26, 2005, and No. 2006-276335, filed on Oct. 10, 2006, the entire content of which is incorporated by reference herein.

What is claimed is:

1. A differential having a first output shaft and a second output shaft, comprising:
an input member for inputting a driving force from an outside of the differential;
a first face gear and a second face gear, both of which can be rotated by the input member, the first face gear and the second face gear being rotatable together with the first output shaft and the second output shaft; and
a pinion member that meshes with both the first face gear and the second face gear so as to allow a differential motion between the first face gear and the second face gear, wherein the input member is provided with a first positioning part for determining an outside position of the pinion member in the radial direction of the differential, and
each of the first face gear and the second face gear is provided with a second positioning part for determining an inside position of the pinion member in the radial direction of the differential.

2. The differential of claim 1, further comprising
a friction member which is interposed between the input member and at least one of the first face gear and the second face gear.

3. The differential of claim 2, wherein
the friction member includes a disc-shaped plate.

4. The differential of claim 1, further comprising
a limited-slip differential mechanism which is interposed between the input member and at least one of the first face gear and the second face gear.

5. The differential of claim 4, wherein
the limited-slip differential mechanism includes a friction clutch.

6. The differential of claim 2 or 4, further comprising
a resilient member arranged between the first face gear and the second face gear, wherein:
the resilient member is connected with the first face gear and the second face gear through a first retainer and a second retainer, respectively; and
the resilient member is arranged so that its pressure acts in a same direction as respective thrust forces of the first face gear and the second face gear due to the first and second gears' meshing with the pinion member.

7. The differential of claim 6, wherein
the friction member is adapted so as to receive the thrust force and the pressure of the resilient member at different positions from each other in a circumferential direction of the friction member.

8. The differential of claim 2 or 4, further comprising a resilient member arranged between the input member and at least one of the first face gear and the second face gear, wherein:
the resilient member is connected with the one of the first and second face gears through the friction member; and
the resilient member is arranged so that its pressure acts in an opposite direction to a thrust force of the one of the first and second face gears due to the one gears' meshing with the pinion gear.

9. The differential of claim 8, wherein
the friction member is adapted so as to receive the thrust force and the pressure of the resilient member at different positions from each other in a circumferential direction of the friction member.

10. The differential of claim 3, wherein
the plate is a single annular plate that is arranged between the input member and at least one of the first face gear and the second face gear; and
both an inner wall formed on the input member and a rear surface of the one of the first and second face gears include annular opposing surfaces extending in a radial direction of the differential while maintaining an interval between the inner wall of the input member and the rear surface of the one of the first and second face gears, the interval having a thickness substantially equal to the plate.

11. The differential of claim 3, wherein
the pinion member comprises a plurality of pinion gears arranged in a circumferential direction of the differential;

the resilient member comprises a plurality of springs arranged in the circumferential direction of the differential; and respective meshing parts between the first and second face gears and the pinion gears and pressing parts of the springs are positioned alternately in the circumferential direction.

12. The differential of claim 1, wherein the first positioning part is shaped to form a spherical surface partially.

13. The differential of claim 1, further comprising a supporting member which is supported by the first face gear and the second face gear, wherein the second positioning part is arranged in the supporting member.

14. The differential of claim 13, wherein the supporting member comprises a spacer for restricting respective positions of both the first face gear and the second face gear in the axial direction of the differential.

15. The differential of claim 13, wherein the supporting member comprises a retainer which supports an elastic member for exerting an elastic force on the first face gear and the second face gear.

16. The differential of claim 1, further comprising an annular oil pool arranged outside the first face gear and the second face gear in the radial direction of the differential.

* * * * *